(12) United States Patent
Potter et al.

(10) Patent No.: US 8,080,966 B2
(45) Date of Patent: Dec. 20, 2011

(54) MOTOR CONTROL ARCHITECTURE FOR SIMULTANEOUSLY CONTROLLING MULTIPLE MOTORS

(75) Inventors: Calvin C. Potter, Mesa, AZ (US); Casey Hanlon, Queen Creek, AZ (US); Paul T. Wingett, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 622 days.

(21) Appl. No.: 12/167,762

(22) Filed: Jul. 3, 2008

(65) Prior Publication Data

US 2010/0001678 A1 Jan. 7, 2010

(51) Int. Cl.
*G05B 11/32* (2006.01)
*G05B 19/19* (2006.01)

(52) U.S. Cl. ......... 318/625; 318/111; 318/626; 318/675

(58) Field of Classification Search .................. 318/569, 318/575, 580, 590, 594, 600, 625, 626, 636, 318/652, 675, 105–113
See application file for complete search history.

(56) References Cited

U.S. PATENT DOCUMENTS

| | | | |
|---|---|---|---|
| 4,055,786 A | 10/1977 | DiMarzio | |
| 4,250,544 A | 2/1981 | Alley | |
| 4,641,069 A | 2/1987 | Fujioka et al. | |
| 4,774,441 A | 9/1988 | Toyomasu et al. | |
| 5,600,220 A | 2/1997 | Thoraval et al. | |
| 5,994,861 A | 11/1999 | Tutumishita | |
| 6,008,597 A * | 12/1999 | Pardo et al. | 318/3 |
| 6,147,469 A * | 11/2000 | Uchida et al. | 318/675 |
| 6,297,610 B1 * | 10/2001 | Bauer et al. | 318/562 |
| 6,590,359 B2 | 7/2003 | Kaufhold et al. | |
| 6,654,645 B2 * | 11/2003 | Bermann et al. | 700/4 |
| 6,757,583 B2 * | 6/2004 | Giamona et al. | 700/189 |
| 6,809,484 B2 | 10/2004 | Makaran et al. | |
| 6,888,331 B2 | 5/2005 | Morales Serrano | |
| 6,933,698 B2 | 8/2005 | Miura et al. | |
| 7,024,257 B2 | 4/2006 | Pearce et al. | |
| 7,038,421 B2 | 5/2006 | Trifilo | |
| 7,145,300 B2 | 12/2006 | Takahashi | |
| 2003/0230998 A1 * | 12/2003 | Miyaji et al. | 318/625 |
| 2006/0227517 A1 * | 10/2006 | Zayas et al. | 361/748 |

* cited by examiner

*Primary Examiner* — Bentsu Ro
(74) *Attorney, Agent, or Firm* — Robert Desmond, Esq.

(57) ABSTRACT

A motor control architecture is provided that simultaneously controls multiple motors. The motor control system includes memory, a plurality of motor control processors, and a communication controller. The motor control processors are each responsive to control signals supplied from the communication controller to selectively retrieve system commands and motor positions from the memory, to generate motor commands, and to supply the generated motor commands to the memory. The communication controller selectively receives system commands and transmits the received system commands to the memory, selectively supplies the command signals to selected ones of the motor control processors, selectively receives motor positions from a plurality of motors, selectively transmits motor positions to the memory, selectively retrieves generated motor commands supplied to the memory, and selectively transmits the retrieved motor commands.

18 Claims, 6 Drawing Sheets

MOTOR CONTROL ARCHITECTURE FOR SIMULTANEOUSLY CONTROLLING MULTIPLE MOTORS

TECHNICAL FIELD

The present invention generally relates to motor controls and, more particularly, to a motor control architecture that allows for a single device to simultaneously control multiple motors.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces. Though unlikely, it is postulated that a flight control surface actuator could become inoperable. Thus, some flight control surface actuation systems are implemented with a plurality of actuators coupled to a single flight control surface.

In many flight control surface actuation systems, the flap actuators and the slat actuators are each driven via a central power drive unit and mechanical drive trains. For example, many flight control surface actuation systems include a central flap power drive unit that drives each of the flap actuators via a plurality of gears and either torque tubes or flexible shafts. Some flight control surface actuation systems similarly include a central slat power drive unit that drives each of the slat actuators via a plurality of gears and either torque tubes or flexible shafts. Alternatively, some flight control surface actuation systems include individual power drive units that individually drive each of the flap and or slat actuators.

The flight control surface actuation systems that use central flap and slat drive units, or that use individual flap and slat actuator power drive units, are generally safe, reliable, and robust. However, these systems do suffer certain drawbacks. Namely, these systems can be relatively complex, can involve the use of numerous parts, and can be relatively heavy. Moreover, the flight control surface actuation systems that use individually driven flap and slat actuators typically rely on numerous controllers, such as one per actuator or flight control surface, which can further increase complexity and weight.

Hence, there is a need for a motor control architecture for simultaneously controlling multiple motors, such as for an aircraft flight control surface actuation system, that is less complex and/or uses fewer parts and/or is lighter than systems that use central drive units and/or provides sufficient redundancy, fault isolation, and monitoring. The present invention addresses one or more of these needs.

BRIEF SUMMARY

In one embodiment, and by way of example only, a motor control system includes memory, a plurality of motor control processors, and a communication controller. The memory selectively stores motor positions, system commands, and motor commands. The plurality of motor control processors are each in operable communication with the memory, and are each responsive to control signals supplied thereto to selectively retrieve system commands and motor positions from the memory, to generate motor commands, and to supply the generated motor commands to the memory. The communication controller is in operable communication with the memory and each of the motor control processors. The communication controller is operable to selectively receive system commands and is further operable to transmit the received system commands to the memory, to selectively supply the command signals to selected ones of the motor control processors, to selectively receive motor positions from a plurality of motors, to selectively transmit the motor positions to the memory, to selectively retrieve the generated motor commands supplied to the memory, and to selectively transmit the retrieved motor commands.

In another exemplary embodiment, an aircraft actuator control system includes a plurality of actuator assemblies and a control circuit. Each actuator assembly includes an electric motor, and each motor includes a motor position sensor operable to sense rotational position. The control circuit is in operable communication with each of the electric motors, and includes memory, a plurality of motor control processors, and a communication controller. The memory selectively stores aircraft commands, motor commands, and motor position data representative of the sensed rotational position of each motor. Each motor control processor is in operable communication with the memory, and each motor control processor is responsive to control signals supplied thereto to selectively retrieve aircraft commands and motor position data from the memory, to generate motor commands, and to supply the generated motor commands to the memory. The communication controller is in operable communication with the memory and each of the motor control processors. The communication controller is operable to selectively receive aircraft commands and is further operable to transmit the received aircraft commands to the memory, to selectively supply the command signals to selected ones of the motor control processors, to selectively receive the motor position data supplied by the motor position sensors, to selectively transmit the received motor position data to the memory, to selectively retrieve the generated motor commands supplied to the memory, and to selectively transmit the retrieved motor commands to selected ones of the motors.

Other desirable features and characteristics of the motor control architecture will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the invention is described as being implemented in the context of an aircraft, and more specifically an aircraft flight control surface actuation control system, it will be appreciated that it can be implemented in numerous other systems and numerous other environments in which multiple motor control is needed or desired.

Figure 1A:
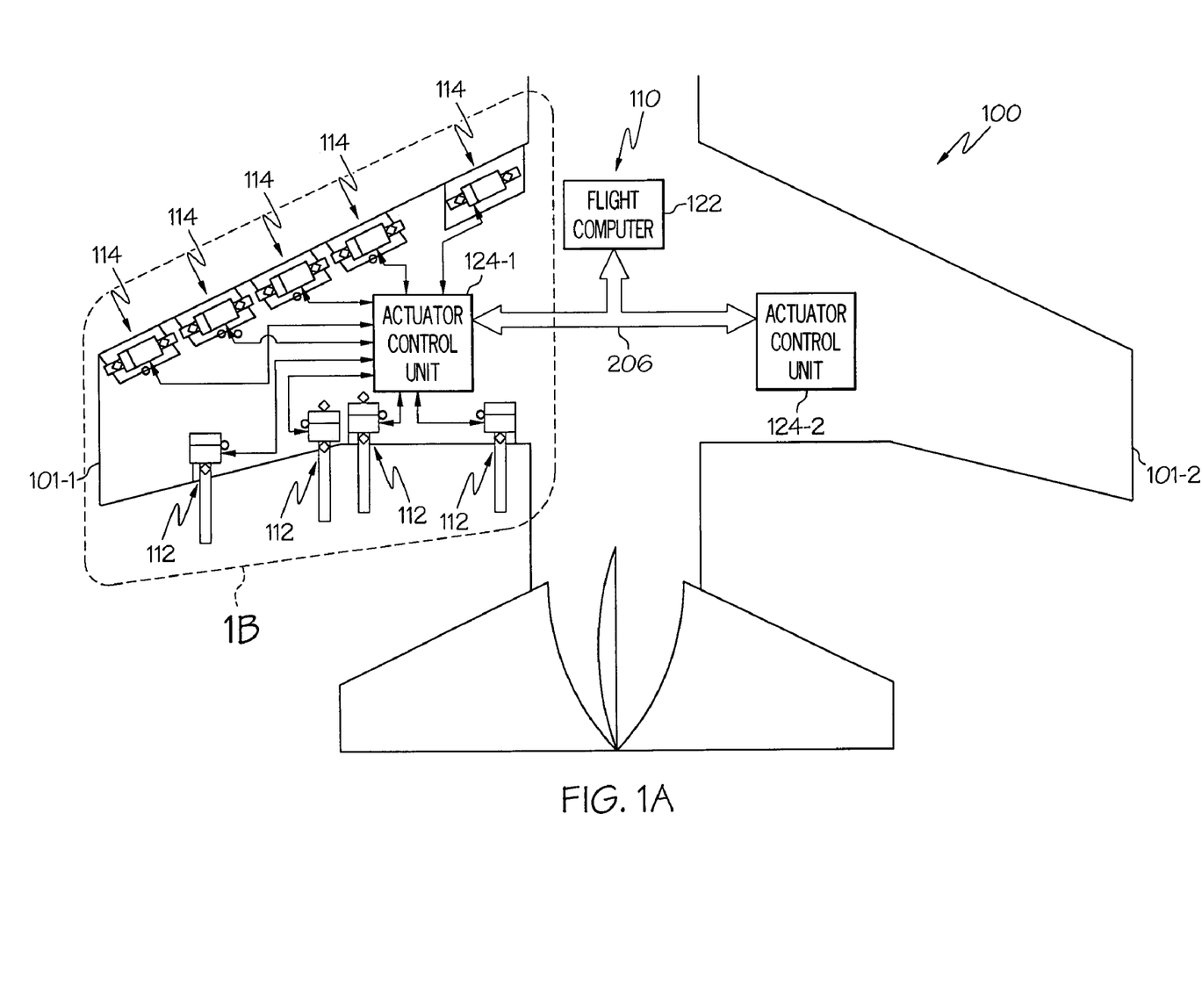
FIGS. 1A and 1B are schematic diagrams of a portion of an exemplary aircraft and a close-up view of a wing of the exemplary aircraft, respectively, depicting an exemplary embodiment of a flight control surface actuation system for aircraft flaps and slats.
Figure 1B:
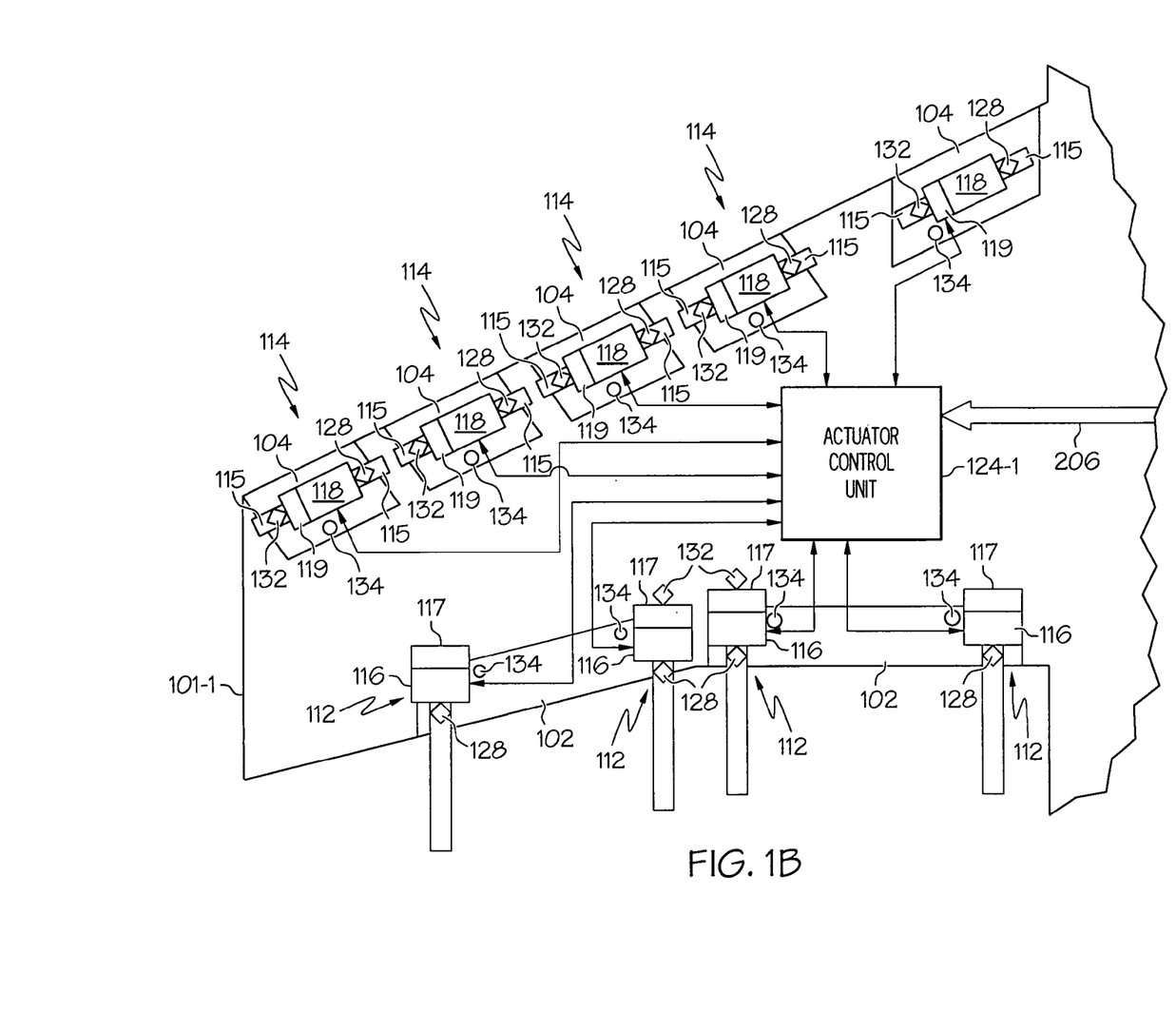

Turning first to FIGS. 1A and 1B, a schematic diagram of a portion of an exemplary aircraft 100 depicting an exemplary embodiment of a flight control surface actuation system 110 for aircraft flaps and slats is provided. The aircraft 100 includes a plurality of trailing edge flight control surfaces 102 and a plurality of leading edge flight control surfaces 104 on each wing 101 (101-1, 101-2). In particular, a plurality of flaps 102 are disposed the trailing edge of each wing 101, and a plurality of slats 104 are disposed on the leading edge of each wing 101. Though not included in the depicted embodiment, it will be appreciated that one of the leading edge flight control surfaces 104 on each wing 101 could also be implemented as a flap. This flight control surface, if included, is sometimes referred to as a Krueger flap. It will be appreciated that the aircraft 100 will typically include various primary flight control surfaces, and may additionally include various other secondary control surfaces, such as spoilers. However, for clarity and ease of illustration and description, these other control surfaces are not depicted or further described. It will additionally be appreciated that, for added clarity, the flaps 102, slats 104, and associated electrical interconnections are shown only for one wing 101-1.

The flaps 102 and slats 104 are high-lift devices that influence the lift and drag of the aircraft 100. For example, during aircraft take-off and landing operations, when increased lift is desirable, the flaps 102 and slats 104 may be moved from stowed positions to deployed positions. In the deployed position, the flaps 104 increase both lift and drag, and enable the aircraft 100 to descend more steeply for a given airspeed, and also enable the aircraft 100 become airborne over a shorter distance. The slats 104, in the deployed position, increase lift, and are typically used in conjunction with the flaps 102.

The flaps 102 and slats 104 are moved between the stowed and deployed positions via the flight control surface actuation system 110. The flight control surface actuation system 110 includes a plurality of flap actuators 112, which are used to move the flaps 104, and a plurality of slat actuators 114, which are used to move the slats 104. The flight control surface actuation system 110 may be implemented using various numbers and types of flap and slat actuators 112, 114. In addition, the number and type of flap and slat actuators 112, 114 per control surface 102, 104 may be varied. In the depicted embodiment, the system 110 is implemented such that two flap actuators 112 are coupled to each flap 102, and one slat actuator 114 is coupled to each slat 104. Moreover, each flap actuator 112 is preferably implemented using a linear-type actuator, such as, for example, a ballscrew actuator, and each slat actuator 114 is preferably implemented using a rotary-type actuator. In the depicted embodiment, the slat actuators 114 additionally include torque tubes 115, which couple the drive force supplied by the actuators 114 to the slats 104. It will be appreciated that this number and type of flap actuators 112 and this number and type of slat actuators 114 is merely exemplary of a preferred embodiment, and that other numbers and types of actuators 112, 114 could also be used.

The actuators 112, 114 are each driven by one or more actuator motors 116, 118, respectively, and may additionally be locked in place by one or more brakes 117, 119, respectively. Preferably, as is shown most clearly in FIG. 1B, one actuator motor 116 is associated with each flap actuator 112, and one actuator motor 118 is associated with each slat actuator 114. The flap and slat actuator motors 116, 118 each receive motor commands and, in response, rotate in one direction or another, to thereby supply a drive force to its associated flap actuator 112 or slat actuator 114. The flap and slat actuators 112, 114 are each coupled to receive the drive force supplied from its associated actuator motor 116, 118 and, depending on the direction in which the actuator motors 116, 118 rotate, move between stowed and deployed positions, to thereby move the flaps 102 and slats 104 between stowed and deployed positions. It will be appreciated that the actuator motors 116, 118 may be implemented as any one of numerous types of AC or DC motors. Preferably, however, the actuator motors 116, 118 are implemented as brushless DC motors that include suitable power electronics (e.g., drivers, power switches, etc.) to convert DC power to AC power and provide appropriate power switching of the motor windings.

Each of the actuator motors 116, 118 also preferably include a commutation sensor 128, such as a resolver, Hall sensors, or other suitable device. Moreover, at least one of the flap actuators 112 coupled to each flap, and each slat actuator 114, preferably include an actuator position sensor 132. The commutation sensors 128 sense the rotational position and speed of the actuator motors 116, 118 and supply motor position and speed feedback signals. The actuator position sensors 132 sense the position of the actuators 112, 114 and supply actuator position feedback signals. It will be appreciated that the actuator position sensors 132 may be implemented using any one of numerous types of sensors including, for example, linear variable differential transformers (LVDTs), rotary variable differential transformers (RVDTs), Hall effect sensors, or potentiometers, just to name a few. The actuator motors 116, 118 may additionally include current sensors 134 to sense the current being supplied to the associated actuator motor 116, 118, and supply current feedback data representative thereof. Suitable sensors 134 that may be used to sense motor current include sense resistors or linear output Hall effect sensors, just to name a few.

The flight control surface actuation system 110 additionally includes one or more flight computers 122 (only one shown), and one or more actuator control units 124. The flight computer 122 receives commands, from either the pilot or an autopilot, and, in response, supplies aircraft (or system) commands to the actuator control units 124. In response to the received aircraft (or system) commands, the actuator control units 124 selectively transmit motor commands to the actuator motors 116, 118. The actuator motors 116, 118, in response to the motor commands, drive the flap and slat actuators 112, 114 to the commanded flap and slat positions, respectively.

It will be appreciated that the number and configuration of actuator control units 124 may vary. For example, while the depicted flight control surface actuation system 110 includes two actuator control units 124-1, 124-2, the system 110 could be implemented with more or less than this number of actuator control units 124. Nonetheless, in the depicted embodiment the actuator control units 124 are configured such that one of the actuator control units 124-1 controls the flap and slat actuators 112, 114 on one wing 101-1, and the other actuator control unit 124-2 controls the flap and slat actuators 112, 114 on the other wing 101-2. A functional block diagram of an exemplary embodiment of one of the actuator control units 124 is depicted in FIG. 2 and will now be described in more detail.

Figure 2:
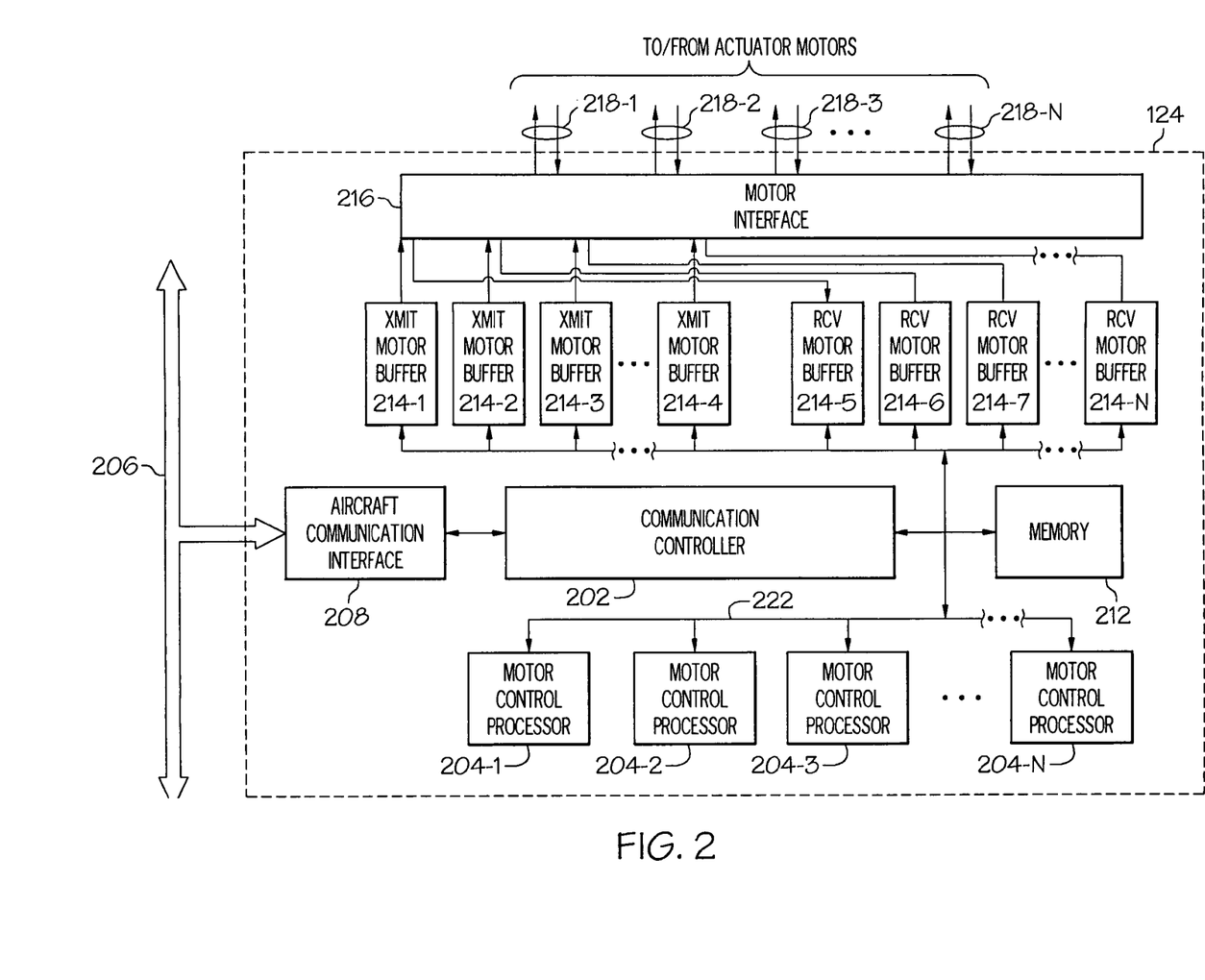
FIG. 2 depicts a functional block diagram of an exemplary embodiment of an actuator control unit that may be used to implement the system of FIG. 1, as well as other systems.

As FIG. 2 depicts, the actuator control units 124 each include a communication controller 202 and a plurality of motor control processors 204 (e.g., 204-1, 204-2, 204-3 . . . 204-N). The communication controller 202 functions as the director/scheduler of all communications between the aircraft 100 and the actuator motors 116, 118. The communication controller 202 receives aircraft (or system) commands via a communication bus 206 and initiates the commanded actions within the actuator control unit 124. The communication controller 202 also selectively receives various feedback data, including various motor data, telemetry data, and health data, and selectively transmits the received feedback data for transmission onto the communication bus 206. In this regard, the communication controller 202 is in operable communication with, or may alternatively include, an aircraft communication interface 208. The aircraft communication interface 208, whether separate from or integrated with the communication controller 202, is in operable communication with the communication bus 206. The aircraft communication interface 208 is configured to selectively receive aircraft commands transmitted to the actuator control units 124 via the communication bus 206, and to transmit the received aircraft commands to the communication controller 202. The aircraft communication interface 208 is also configured to transmit the feedback data transmitted by the communication controller 202 onto the communication bus 206 for transmission to, for example, the flight computers 122.

The communication controller 202, at least in the depicted embodiment, is also in operable communication with each of the motor control processors 204, memory 212, and a plurality of motor buffers 214 (e.g., 214-1, 214-2, 214-3, . . . 214-N). The communication controller 202, in addition to the above-noted functions, also transmits the received aircraft (or system) commands to the memory 212, selectively supplies command signals to selected ones of the motor control processors 204, selectively receives motor positions from the commutation sensors 128 and transmits these to the memory 212, selectively retrieves motor commands from the memory 212, and selectively transmits the motor commands retrieved from the memory 212. Specifically, when an aircraft (or system) command to move an actuator assembly 112, 114 (e.g., a flight control surface) is transmitted to the actuator control unit 124, the command is supplied to the communication controller 202 via the aircraft communication interface 208. The communication controller 202, upon receipt of the command, supplies the commands to the memory 212. The communication controller 202 further supplies command signals to selected ones of the motor control processors 204.

The motor control processors 204 are each configured, upon being supplied with a command signal from the communication controller 202, to implement a motor control algorithm. The motor control algorithm, which may implement position control, speed control, current control, or various combinations thereof, is responsive to input commands and feedback data to generate and supply motor commands. More specifically, each motor control processor 204, upon receipt of a command signal from the communication controller 202, retrieves aircraft (or system) commands, motor positions, and motor current data from the memory 212. The motor control processors 204, implementing the motor control algorithm, generate motor commands, and supply the generated motor commands to the memory 212.

The motor commands that are generated by the motor control processors 204 and supplied to the memory 212 are retrieved by the communication controller 202 and supplied to the appropriate motor buffer 214. The motor buffers 214, upon receipt of motor commands, and under the control of the communication controller 202, transmit the motor commands to the appropriate actuator motor 116, 118. In the depicted embodiment, the actuator control unit 124 additionally includes a motor interface 216 that is in operable communication between the motor buffers 214 and the actuator motors 116, 118. The motor interface 216, if included, is configured to receive the motor commands transmitted by the motor buffers 214, and then transmit these motor commands to the appropriate actuator motors 116, 118. The motor interface 216 is also preferably configured to receive motor feedback data from the actuator motors 116, 118, and transmit these feedback data to appropriate motor buffers 214. The communication between the motor interface 216 and each of the actuator motors 116, 118 is preferably implemented via a plurality of individual high speed serial busses 218 (e.g., 218-1, 218-2, 218-3 . . . 218-N). As may be appreciated, each bus 218 is bi-directional, which allows it to transmit the motor commands to the actuator motors 116, 118, and more specifically the associated integral power electronics, and to receive motor feedback data, such as motor positions, motor currents, and power electronic status, just to name a few.

The motor buffers 204, also under the control of the communication controller 202, will transmit the received feedback data to the memory 212 for retrieval, as needed, by the communication controller 202, the motor control processors 204, or both. In the depicted embodiment it is seen that the actuator control unit 124 is configured to include a plurality of transmit motor buffers 214 and a plurality of receive motor buffers 214, thereby having two motor buffers 214 associated with each actuator motor 116, 118. It will be appreciated that this is merely exemplary of a particular embodiment, and that the motor buffers 214 could be implemented as transmit/receive motor buffers, thereby having a single motor buffer 214 associated with each actuator motor 116, 118.

The communication controller 202 not only starts and stops the motor control execution implemented in the motor control processors 204, but it monitors the processing activity of each activated motor control processor 204 to ensure the motor control processors 204 are sharing the processing load. The communication controller 202 additionally determines the number of motor control processors 204 needed to implement the aircraft (or system) commands it receives. It is noted that in a particular embodiment, the time it takes for a motor control processor 204 to complete a motor control processing routine is about 50 µsec. Once an aircraft (or system) command is received, the processing time for the actuator control unit 124 is about 200 μsec. It may thus be appreciated that a single motor control processor 204, if needed or desired, may accommodate up to four actuator motors 116, 118 at a 5 kHz update rate.

Before proceeding further, it is noted that the communication controller 202 may be implemented using one, or a plurality, of any one of numerous suitable devices including, but not limited to, one or more general-purpose processors, one or more digital signal processors, one or more application specific processors, or various combinations thereof More-over, the communication controller 202 may implement its functionality, either wholly or partially, via hardware, software, firmware, or various combinations thereof The motor control processors 204 may additionally be implemented using any one of numerous suitable devices including, but not limited to, one or more general-purpose processors, one or more digital signal processors, one or more application specific processors, or various combinations thereof. The motor control processors 204 may additionally implement the above-described functionality, either wholly or partially, via hardware, software, firmware, or various combinations thereof. The memory 212, though depicted using a single functional block, may be implemented using a plurality of suitable memory devices. Some non-limiting examples include suitable single or dual-port random access memory (RAM), electronically erasable ($E^2$) memory, or various combinations thereof.

In addition to the above, it will be appreciated that the communication interface 206 and the motor interface 206 may be variously implemented. Preferably, each is implemented to be compatible with the system in which the actuator control unit 124 is installed. For example, in the depicted embodiment, in which the actuator control unit 124 is installed in an aircraft, the communication interface 206 and motor interface 216 may be compatible with, and configured to transmit and receive data serially via, the ARINC communication protocol. It will additionally be appreciated that the interfaces 206, 216 may be configured to communicate via other protocols, such as the 1553 protocol, and via various types of media, including wired communication, wireless (e.g., RF) communication, or fiber optic communication.

No matter how the communication controller 202, the motor control processors 204, the communication interface 206, the memory 212, the motor buffers 214, and the motor interface 216 are specifically implemented, these devices are preferably in operable communication via an internal actuator control unit communication bus 222. This communication bus 222 may be variously implemented, but in the depicted embodiment the communication bus 222 is implemented as a suitable serial communication bus.

Having described the overall structure of one of the actuator control units 124, and having generally described the operations of each of the functional blocks that comprise an actuator control unit 124, as slightly more detailed description of the operation of the actuator control units 124 will now be provided. In particular, it is noted that the actuator control unit 124 preferably implements its functions via software though, as noted above, it could do so via firmware and/or hardware. Nonetheless, a description of the preferred software implementation will now be provided. In doing so, reference should first be made to FIG. 3, which depicts a state diagram of the system software implemented in the actuator control unit 124.

Figure 3:
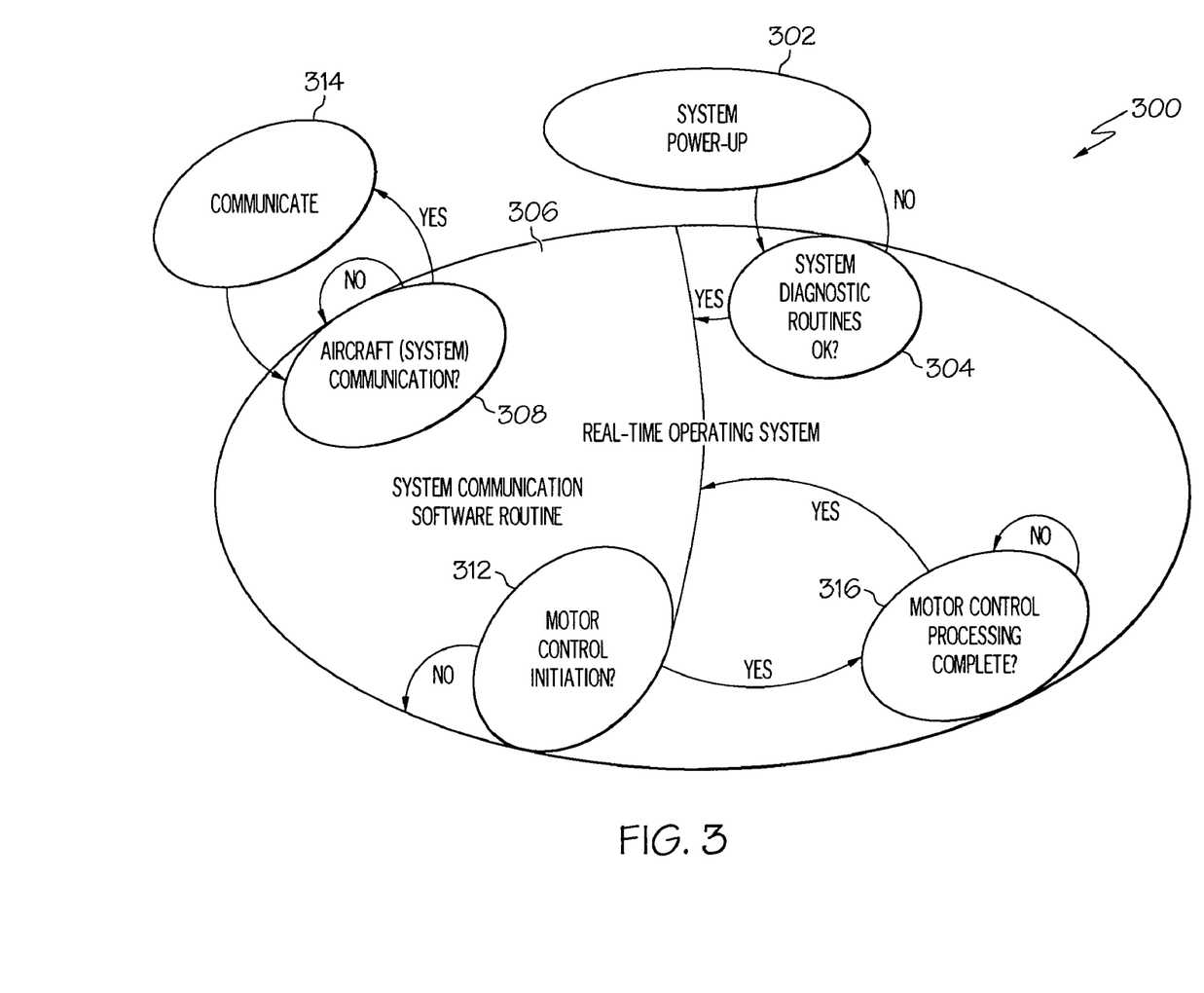
FIG. 3 is a state diagram depicting an exemplary embodiment of the overall system software flow for the control unit depicted in FIG. 2.

As FIG. 3 depicts, the system software 300 initiates an initialization routine upon system power up 302. Following the initialization routine, the system preferably conducts various system diagnostic routines 304 to determine whether it is operating properly. If one or more of the system diagnostic routines indicate the actuator control unit 124 is not operating properly, the system software returns to the initialization routine 302. If, however, the system diagnostic routines indicate the actuator control unit 124 is operating properly, the system communication software routine 306 is initiated and run.

Figure 4:
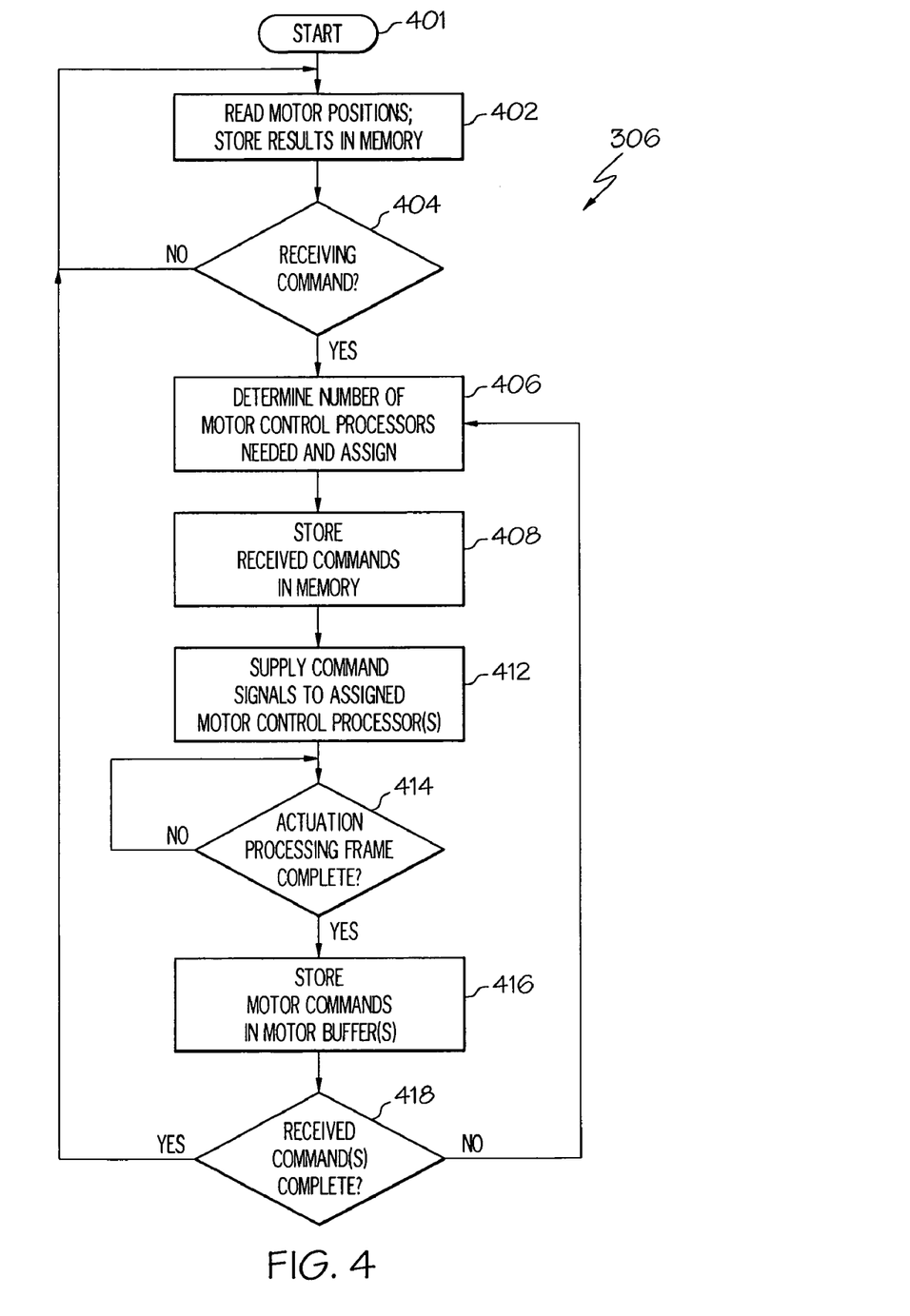
FIG. 4 is a flowchart depicting a system communication software routine that is implemented as part of the overall system software illustrated in FIG. 3.

The system communication software routine 306 implements two general functions. One function is an aircraft (or system) communication function 308, and the other function is a motor control initiation function 312. The aircraft (or system) communication function 308 determines whether the actuator control unit 124 should be receiving a communication (such as a command) from, or transmitting a communication (such as feedback data) to, the aircraft (or system). If the actuator control unit 124 should be transmitting or receiving a communication then communication is initiated and completed 314, otherwise it awaits the need to do so. The motor control initiation function 312 determines whether the actuator control unit 124 needs to implement motor control processing to effectuate actuator movement. If so, a motor control processing routine 316 is initiated and completed; if not, the communication software routine awaits the need for motor control processing. As FIG. 3 depicts, upon completion of the motor control processing routine 316, control is transferred back to the system communication software routine 306. With reference now to FIG. 4, a more detailed description of a particular preferred embodiment the system communication software routine 306 is depicted and will now be described.

The system communication software routine 306, upon initiation (401), commands the communication controller 202 to read each of the motor positions and store the positions in the memory 212 (402). Thereafter, and as noted above, the communication controller 202 determines whether the actuator control unit 124 is receiving a command (404). If not, the routine continuously loops until one or more commands are received. When one or more commands are received, the communication controller 202 determines the number of motor control processors 204 needed to implement the command(s), and assigns the particular motor control processors 204 to carry out the command(s) (406). The communication controller 202 also stores the received command(s) in the memory 212 (408), and supplies the command signals to the assigned motor control processors 204 (412).

As will be discussed momentarily, the assigned motor control processors 204, upon receipt of the command signals, initiate the motor control processing routine 316. While this processing is taking place, the system communication software routine 306 awaits the completion, by the motor control processing routine 316, of an actuator processing frame (414). When an actuator processing frame is complete, the communication controller 202 loads the motor command(s) into the appropriate motor buffer 214 for transmission to the appropriate actuator motor 116, 118 (416). The communication controller 202 also determines, from the motor feedback data supplied from the motor buffers 214, whether the received command(s) is (are) completed (418). If so, the routine returns to the beginning (402); if not, the previous steps (406-414) are repeated.

Figure 5:
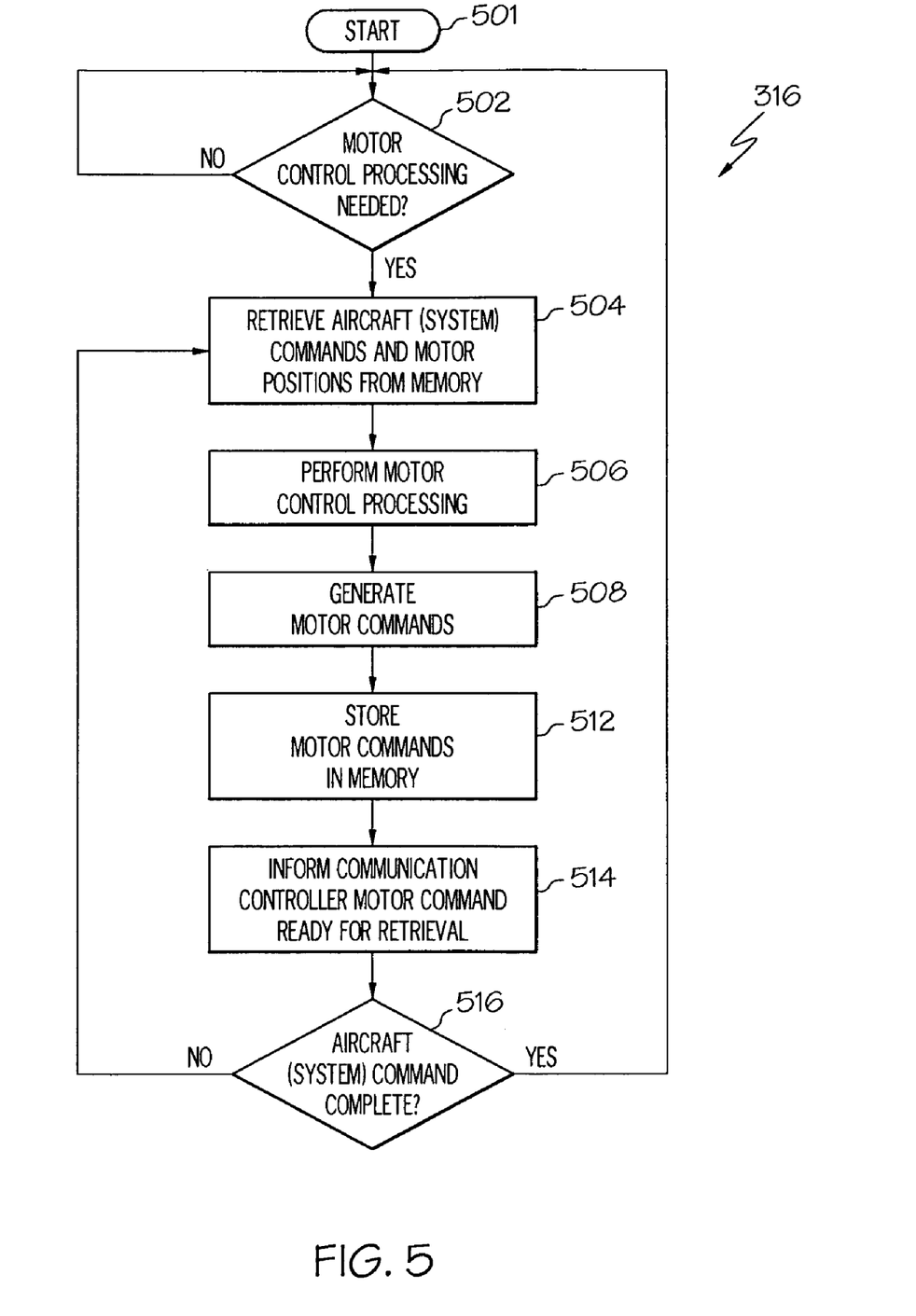
FIG. 5 is a flowchart depicting a motor control processing routine that is implemented as part of the overall system software illustrated in FIG. 3.

Turning now to FIG. 5, the motor control processing routine 316 that is implemented by each of the assigned motor control processors 204 will now be described. The motor control processors 204 await a communication (e.g., a command signal from the communication controller 202) indicating that motor control processing is needed (502). Upon determining that motor control processing is needed, each of the assigned motor control processors 204 retrieves the aircraft (or system) commands and appropriate motor positions that the communication controller 202 has stored in the memory 212 (504). Using the retrieved aircraft (or system) commands and motor positions, the motor control processors 204, implementing the above-mentioned motor control algorithm, perform appropriate motor control processing (506), generate motor commands (508), and store the motor commands in the memory (512). Each motor control processors 204, upon storing the motor command in the memory 212, informs the communication controller 202 that the motor command is ready for retrieval, as discussed above, by the communication controller 202 (514). The motor control processing continues (504-514) until the appropriate motor control processor(s) 204 have determined that the aircraft (or system) command has been completed (516). Upon completion of the command, the motor control processors 204 once again await a communication indicating that motor control processing is needed (502).

The system described herein provides a motor control architecture that simultaneously controls multiple motors. The system may be used in an aircraft flight control surface actuation system or in any one of numerous other systems for which simultaneous control of multiple motors is need or desired.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A motor control system, comprising:
   memory for selectively storing motor positions, system commands, and motor commands;
   a plurality of motor control processors in operable communication with the memory, each motor control processor responsive to control signals supplied thereto to (i) selectively retrieve system commands and motor positions from the memory, (ii) generate motor commands, and (iii) supply the generated motor commands to the memory;
   a communication controller in operable communication with the memory and each of the motor control processors, the communication controller operable to selectively receive system commands and further operable to:
      (i) transmit the received system commands to the memory,
      (ii) selectively supply the command signals to selected ones of the motor control processors,
      (iii) selectively receive motor positions from a plurality of motors,
      (iv) selectively transmit the motor positions to the memory,
      (v) selectively retrieve the generated motor commands supplied to the memory, and
      (vi) selectively transmit the retrieved motor commands; and
   a plurality of motor buffers in operable communication with the communication controller, each motor buffer coupled to selectively receive and transmit at least the motor commands transmitted by the communication controller.

2. The system of claim 1, further comprising:
   a motor interface in operable communication with each of the motor buffers, the motor interface coupled to receive and transmit the motor commands transmitted by the motor buffers.

3. The system of claim 2, wherein the motor interface is adapted to receive motor feedback data and transmit the motor feedback data to selected ones of the motor buffers.

4. The system of claim 1, further comprising:
   a serial communication bus coupled between the communication controller and the plurality of motor control processors.

5. The system of claim 1, wherein the communication controller is further operable to selectively transmit motor feedback data.

6. The system of claim 5, further comprising:
   a system communication interface in operable communication with the communication controller, the communication interface operable to selectively transmit the system commands to, and receive the motor feedback data transmitted by, the communication controller.

7. The system of claim 1, wherein the communication controller is adapted to serially communicate with the communication system.

8. The system of claim 1, wherein the communication controller is further operable to monitor each of the motor control processors and selectively supply the command signals to the motor control processors to at least substantially balance overall processing load.

9. The system of claim 1, wherein the communication controller is further operable to:
   determine a number of motor control processors needed to process and execute each of the received system commands; and
   supply the command signals to that number of motor control processors.

10. An aircraft actuator control system, comprising:
   a plurality of actuator assemblies, each actuator assembly including an electric motor, each motor including a motor position sensor operable to sense rotational position; and
   a control circuit in operable communication with each of the electric motors, the control circuit comprising:
      memory for selectively storing aircraft commands, motor commands, and motor position data, the motor position data representative of the sensed rotational position of each motor;
      a plurality of motor control processors in operable communication with the memory, each motor control processor responsive to control signals supplied thereto to (i) selectively retrieve aircraft commands and motor position data from the memory, (ii) generate motor commands, and (iii) supply the generated motor commands to the memory; and
      a communication controller in operable communication with the memory and each of the motor control processors, the communication controller operable to selectively receive aircraft commands and further operable to:
         (i) transmit the received aircraft commands to the memory, (ii) selectively supply the command signals to selected ones of the motor control processors, (iii) selectively receive the motor position data supplied by the motor position sensors, (iv) selectively transmit the received motor position data to the memory, (v) selectively retrieve the generated motor commands supplied to the memory, and (vi) selectively transmit the retrieved motor commands to selected ones of the motors, wherein the communication controller is further operable to:

determine a number of motor control processors needed to process and execute each of the received aircraft commands; and supply the command signals to that number of motor control processors.

11. The system of claim 10, further comprising:

a plurality of motor buffers in operable communication with the communication controller, each motor buffer coupled to selectively receive and transmit at least the motor commands transmitted by the communication controller.

12. The system of claim 11, further comprising:

a motor interface in operable communication with each of the motor buffers, the motor interface coupled to receive and transmit the motor commands transmitted by the motor buffers.

13. The system of claim 12, wherein the motor interface is adapted to receive motor feedback data and transmit the motor feedback data to selected ones of the motor buffers.

14. The system of claim 10, further comprising:

a serial communication bus coupled between the communication controller and the plurality of motor control processors.

15. The system of claim 10, wherein the communication controller is further operable to selectively transmit motor feedback data.

16. The system of claim 15, further comprising:

an aircraft communication interface in operable communication with the communication controller, the aircraft interface operable to selectively transmit the aircraft commands to, and receive the motor feedback data transmitted by, the communication controller.

17. The system of claim 10, wherein the communication controller is adapted to serially communicate with the aircraft communication system.

18. The system of claim 10, wherein the communication controller is further operable to monitor each of the motor control processors and selectively supply the command signals to the motor control processors to at least substantially balance overall processing load.

* * * * *